United States Patent
Gross et al.

[15] 3,683,209
[45] Aug. 8, 1972

[54] REACTOR CORE FOR THERMIONIC NUCLEAR REACTOR

[72] Inventors: Franz Gross, Neckargemund; Rudolf Krapf, Leimen, both of Germany

[73] Assignee: Brown, Boveri & Cie A.G., Mannheim-Kafertal, Germany

[22] Filed: Dec. 29, 1967

[21] Appl. No.: 694,592

[30] Foreign Application Priority Data

Jan. 3, 1967 Germany.................B 90576

[52] U.S. Cl.........................................310/4, 176/39
[51] Int. Cl..................................................H02n 3/00
[58] Field of Search...........................176/39; 310/4

[56] References Cited

UNITED STATES PATENTS

| 3,093,567 | 6/1963 | Jablonski et al.............310/4 |
| 3,444,400 | 5/1969 | Janner et al.................310/4 |
| 3,079,320 | 2/1963 | Weill...........................176/21 |
| 3,176,165 | 3/1965 | Lawrence.....................310/4 |
| 3,179,822 | 4/1965 | Block............................310/4 |
| 3,259,766 | 7/1966 | Beckjord et al. .............310/4 |
| 3,304,232 | 2/1967 | Schutt..........................310/4 |
| 3,439,193 | 4/1969 | Bensussan....................310/4 |
| 3,440,455 | 4/1969 | Stahl et al....................176/39 |

Primary Examiner—Reuben Epstein
Attorney—Nathan M. Briskin

[57] ABSTRACT

This invention relates to a reactor core for a nuclear reactor, particularly for a "fast" type nuclear reactor, provided with nuclear fuel, for direct conversion into electrical energy of released heat produced by nuclear fission. The heat-to-electricity conversion takes place by means of thermionic converters having an inner-positioned collector and an outer-positioned emitter. The nuclear fuel is subdivided into sub-critical discs whose reactivity is influenced by a change in their mutual distance from each other; and the thermionic converter is imbedded in these individual discs. Additional controls in the form of control rods may also be provided to change the reactivity of the reactor core.

5 Claims, 3 Drawing Figures

Inventors
FRANZ GROSS
RUDOLPH KRAPF

ATTORNEY

Inventors
FRANZ GROSS
RUDOLPH KRAPF

ATTORNEY

REACTOR CORE FOR THERMIONIC NUCLEAR REACTOR

BACKGROUND OF THE INVENTION

1. Field of the Invention

This invention relates to improvements in nuclear reactors provided with thermionic converter devices for direct conversion of the released heat into electrical energy. For background information, reference is made to the copending application entitled "Nuclear Rector With Thermionic Converters", Ser. No. 637,822, May 11, 1967, of Kurt Stahl, Reinhart Langpape, and Ned S. Rasnor now U.S. Pat. No. 3,440,455, dated Apr. 22, 1969, and also the copending application entitled "Thermionic Fuel Rod With Nuclear fuel", Ser. No. 657,820, Aug. 2, 1967, of Franz Gross et al.; and particularly our earlier filed copending application Ser. No. 670,187, Sept. 25, 1967, all assigned to the assignee of the present application. For further background literature, reference may be had to the article entitled "Entwurfsstudie einer Energieversorgungsanlage fur Raumfluggerate mit einem thermischen Kernreaktor (TRIKT–50)" (translated as "Outline of a Power Supply Installation for Space Vehicles with a Thermionic Nuclear Reactor (TRIKT –50)") by Von W. Haug et al., Atomkernenergie, 10 th yr. (1965), Vol. 9/10, pp. 363–367.

2. Description of the Prior Art

Thermionic energy transducers or converters are used for converting heat energy directly into electrical energy. The converters are comprised of two closely spaced adjacent electrodes, one of which, known as the emitter, is so strongly heated that it emits electrons, which are then removed by the other electrode, known as the collector. The resulting difference of the respective outlet terminals is available as a source of electrical energy.

As is known from thermionic emission tubes, a negative space charge occurs in front of an electron-emitting surface, which impedes the further output of electrons. For this reason, the distance or interspace between the electrodes is made quite small, or the negative space charge is compensated by positive ions. For this purpose, caesium vapor is primarily supplied to the interspace between the electrodes.

Known nuclear fission processes may be used as a heating source. In known devices for thermic reactors, the nuclear fuel is assembled with the electrodes into a thermionic converter, several of which being electrically connected in series as a thermionic fuel rod. In these known present devices, the nuclear fuel is disposed inside of the emitter. The resulting fission gases are collected in a special space or chamber from which they are continuously pumped off.

Such nuclear fuel rods as above described form, for example, together with the moderator, the reflector, and the regulating or control rods, a thermic nuclear reactor. For further background information and details reference may be had to the above-mentioned article in the periodical publication: "Atomkern-Energie", 1965, volume 9/10, page 365 et seq. When such nuclear reactors as therein described are intended to be sued in space vehicles to supply energy for the airborne equipment, the goal should be the least possible capacity weight (i.e. mass per capacity unit), since the mass plays such a decisive role in such uses due to the high cost of transport.

For this reason, fast reactors are preferred for large capacities over 200 $kW_{el}$, since the absence of the moderator in the reactors permits a more compact device at a lower capacity weight. Thus, it has been suggested, for example, in a known embodiment described in the above-mentioned article in the periodical publication in "Atomkern-Energie", 1965, volume 9/10, at page 368, to install the thermionic fuel rods in the fission zone region of a fast reactor, in the form of a hexagonal grid or control electrode within the pressure container.

Fast reactors which are designed for a capacity range up to 2 $MW_{th}$ (two Megawatts of thermal power output) must contain about 50 percent of their total weight in nuclear fuel, so that the entire device could still become critical. Approximately 35 percent of the nuclear core volume must furthermore be used for coolants, so that only about 15 percent of the volume portion of the core remains available for the thermionic fuel rods or elements.

This kind of distribution of the volume for the nuclear fuel and the known types of thermionic fuel rods or elements cannot be attained, within the above-discussed output capacity range, in a device which contains the nuclear fuel inside a cylindrical emitter.

To avoid these above-described short-comings of the prior art, our earlier filed patent application Ser. No. 670,187, filed Sept. 25, 1967, described thermionic converters or transducers comprising concentric collectors and emitters, the collectors being disposed as inside electrodes and the respective emitters being disposed as outside electrodes, surrounded by the nuclear fuel. In this instance, the inside chamber of the collector contains the equipment for the inlet and outlet of the coolant. The equipment may be designed as concentric pipes, arranged for flow in the counter-current directions, or as through-pipes. As a further improvement, if the thermionic converters are electrically connected in parallel, the cooling cycle equipment may serve, at the same time, as a conductor for the collector currents.

SUMMARY OF THE INVENTION

It is therefore an object of the present invention to provide the most favorable device to serve this latter purpose. The present invention is characterized by the fact, first, that the nuclear fuel is sub-divided into sub-critical discs whose reactivity is influenced by providing means for changing their mutual distances between each other, and secondly, through the fact that the converters are imbedded inside the individual fuel discs. It is a known fact that the reactivity of a nuclear reactor is a measure of the rate of production of neutrons, that is, the resultant flow of neutrons.

According to a further embodiment of the invention, the reactivity of the core is changed by additional adjustable control rods arranged in a manner known per se. Such adjustable control rods may be the only means for changing the reactivity of the core, the discs then being fixed with respect to each other, or the control rods may be employed in cores in accordance with the invention wherein the discs are adjustable toward and away from each other.

Brief Description of the Drawing

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views.

Description of the Preferred Embodiments

Figure 1:
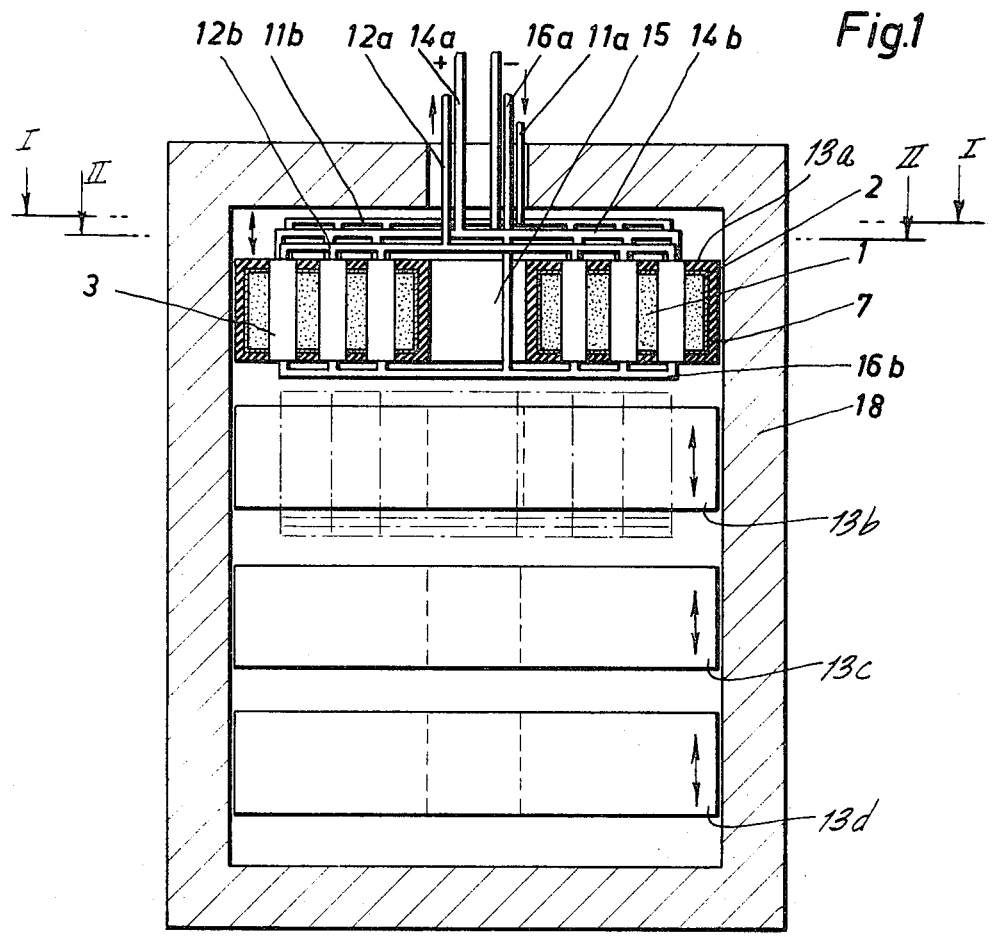
FIG. 1 is a view in cross section through the reactor, the section being taken parallel to the axis of the reactor.

As illustrated in FIG. 1, the sub-critical mass of nuclear fuel 1 is disposed in a cylindrical metallic enclosure 2. The metallic enclosure and the nuclear fuel form a disc; four such discs are shown in FIG. 1, such discs being designated 13a–13d. Such enclosure 2 comprises a so-called cladding and is surrounded by a heat insulating wall 7. Centrally located along the axis of the device is a duct or channel 15 which receives the leads or lines which all of the thermionic converters of the unit have in common. Such leads include 11a, 11b for the supply of caesium vapor, 12a, 12b for the inlet of coolant, 16a, 16b for the outlet of coolant, and 14a, 14b for the current-carrying leads.

Figure 2:
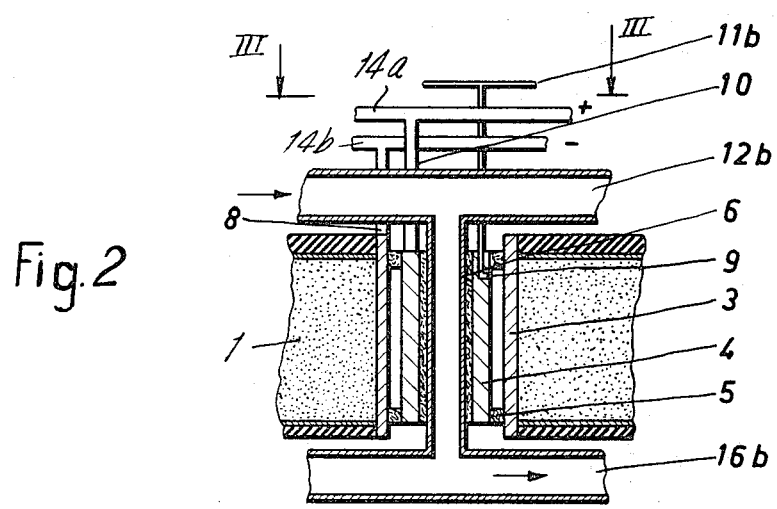
FIG. 2 is an enlarged view of a detail of FIG. 1.

The cladding 2 also serves for holding and supporting the emitter 3 of the individual thermionic converters or transducers. The cladding 2 has upper and lower walls and peripheral inner and outer walls which provide a chamber for receiving nuclear fuel. The converters are distributed at least substantially uniformly over the area of the disc formed by the cladding 2, the emitters 3 of the converters being surrounded by the nuclear fuel. Each of the converters comprises an emitter 3, made in the form of a cylindrical tube, and a collector 4 (FIG. 2) positioned within the emitter at least generally coaxial thereof. The emitter and collector are separated from each other by insulation rings 5, as more fully described in our above-mentioned copending application Ser. No. 657,820, such insulating rings forming an electrode space which is filled with caesium vapor. At the same time, the collector forms the outer jacket or housing of the tubes 6 through which the coolant, flowing in a cycle, passes. The caesium vapor is supplied to all converters, via a network of pipelines 11a, 11b and the respective duct 9, in the collector or emitter, into the intermediary space between the electrodes. The leads or connecting lines 16a, 16b serve for supplying the coolant to the tubes 6, whereas the leads 12a, 12b serve to supply coolant to tubes 6. The current collectors 8, 10 of the converter may be electrically connected in series as shown in Segment III in FIG. 3 or in parallel as shown in Segment IV, depending upon the current-voltage requirements.

The aforedescribed combination of cladding, nuclear fuel, and other parts of the composite converter is positioned axially centrally within a reflector housing 18 by means of guides which permit their adjustment axially of the housing 18, and are adjusted by means of mechanical devices (not shown) well known in the reactor art. In accordance with the present invention, a plurality of these composite converters, spaced axially from each other as shown in FIG. 1, form the core of a fast reactor.

Figure 3:
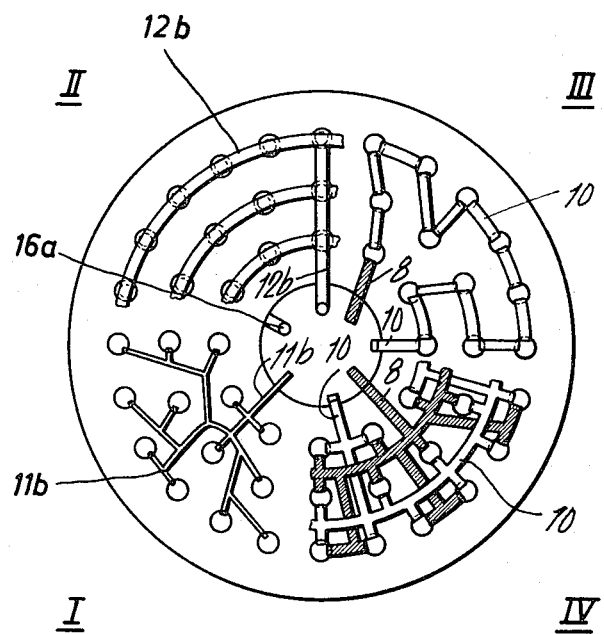
FIG. 3 is a series of top plan views looking down upon a disc, the respective quadrants I, II, III, and IV thereof illustrating respective interconnected portions of the discs.

FIG. 3 shows a topview looking down upon a converter device, in such a way that each quadrant shows only a portion of the connections of the individual converters, namely:

Quadrant I, the caesium supply;
Quadrant II, the inlet and outlet of the coolant;
Quadrant III, an electrical series-connection of the converters; and
Quadrant IV, an electrical parallel-connection of the converters.

It will thus be seen that the connected structures of Quadrants I, II, and III of FIG. 3 show one converter in accordance with the invention, and that the connected structures of Quadrants I, II, and IV of FIG. 3 show another converter in accordance with the invention.

The output control or regulation of this reactor may be effected, for example, by varying the distances of the individual converter devices from each other; such variation changes the reactivity of the reactor. The discs 13a–13d are selectively moved closer to an further away from each other by conventional means as shown. A change in reactivity may also be effected by a rough control produced by the change in distance between individual converters, while precise regulation or control is effected, in a known manner, by means of additional control rods, such control rods being selectively inserted into the reactor to control the rate of production of neutrons therein.

Finally, the individual converter devices may be attached within the reflector at fixed distances from each other, and the required reactivity changes may be effected only by means of control rods.

In accordance with the present invention, the resulting specific weight of the reactor core is low. An additional advantage lies in the fact that the radioactive gases, released during nuclear fission, diffuse from the nuclear fuel through pores or openings provided in the cladding 2, into a mutual fission gas chamber so that the fission-gas ventilation, which is provided in each conventional converter or fuel rod, is eliminated.

Although a limited number of embodiments of the invention have been illustrated in the accompanying drawings and described in the foregoing specification it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus in accordance with the present invention several of the above described converters may be combined into short fuel rods which are employed in the devices shown in FIG. 1.

We claim:

1. A thermionic device for converting heat directly into electrical energy, comprising, in combination a plurality of superposed aligned discs forming a fast reactor core and each having a space defined by a cylindrical enclosure to receive nuclear fuel of subcritical dimension, nuclear fuel in said enclosure, thermionic converters affixed to each of said discs within the borders thereof, each of said converters having a collector and an emitter with the emitter outwardly disposed with respect to the collector, the collectors and emitters being spaced from each other, and insulating ring means forming a sealed electrode space disposed between respective collectors and the emitters, the emitters being in contact with the nuclear fuel disposed in said space.

2. A device according to claim 1, wherein said emitter is in the form of a cylindrical tube and is positioned externally of said collector.

3. A device according to claim 1, wherein said discs are hollow and have upper and lower walls, and the nuclear fuel receiving space in each said disc is bounded by said upper and lower walls.

4. A device according to claim 1, wherein the discs are enclosed within a reflector housing and form a fast reactor core, said housing having a top opening for inlet and outlet leads.

5. A device according to claim 4, wherein the aligned discs are vertically spaced within the housing.

* * * * *